United States Patent [19]

Chevroulet et al.

[11] Patent Number: 4,652,226

[45] Date of Patent: Mar. 24, 1987

[54] APPARATUS FOR THE CONTINUOUS PRODUCTION OF ELECTRODE MATERIAL

[75] Inventors: Léon Chevroulet; Guy Salmon, both of Pratteln, Switzerland

[73] Assignee: Buss AG, Basel, Switzerland

[21] Appl. No.: 771,394

[22] Filed: Aug. 30, 1985

[30] Foreign Application Priority Data

Aug. 30, 1984 [DE] Fed. Rep. of Germany ....... 3431897

[51] Int. Cl.[4] .............................................. B29B 7/28
[52] U.S. Cl. .................................... 425/147; 425/188; 425/154; 264/142
[58] Field of Search ................ 425/147, 188; 264/142; 425/143, 154

[56] References Cited

U.S. PATENT DOCUMENTS

| | | | |
|---|---|---|---|
| 9,162 | 4/1880 | McKenzie | 425/188 |
| 2,215,435 | 9/1940 | Hale | 264/142 |
| 2,499,913 | 3/1950 | Gordon | 425/188 |
| 2,688,941 | 9/1954 | Zeun | 425/147 |
| 3,078,515 | 2/1963 | Wintriss | 425/154 |
| 3,283,041 | 11/1966 | Sommerfeld | 425/143 |
| 3,899,326 | 8/1975 | Frost et al. | 264/177 R |
| 3,913,796 | 10/1975 | Aoki | 425/147 |
| 3,919,384 | 11/1975 | Cantaloupe et al. | 264/177 R |
| 3,959,431 | 5/1976 | Nissel | 264/177 R |
| 4,214,859 | 7/1980 | Anders | 425/147 |
| 4,286,882 | 9/1981 | Schiesser | 425/147 |
| 4,398,876 | 8/1983 | Ohtawa et al. | 425/143 |
| 4,479,768 | 10/1984 | Kube et al. | 264/142 |
| 4,511,319 | 4/1985 | Takayama | 425/147 |

FOREIGN PATENT DOCUMENTS 2302965   7/1974   Fed. Rep. of Germany ...... 425/147

Primary Examiner—Tim Miles
Attorney, Agent, or Firm—Karl F. Ross; Herbert Dubno

[57] ABSTRACT

The continuous production of electrode material consisting of pitch, coke dust and coke particles of variable sizes comprising the steps of mixing and kneading the components in a horizontally arranged mixing and kneading device. An extruder is provided at the output end of the mixing and kneading device and connected with the same by way of a vertically arranged chute. The rotation of the extruder is controlled by a sensoring device provided in the vertically arranged chute. A lateral ejector orifice provided in the chute is shut off by means of an ejector flap subject to the influence of a control device; this in turn also exerts its influence on the extruder drive. The forming operation is completely separated from the mixing and kneading process, so that no mutual influencing can take place.

13 Claims, 3 Drawing Figures

APPARATUS FOR THE CONTINUOUS PRODUCTION OF ELECTRODE MATERIAL

FIELD OF THE INVENTION

The present invention refers to an apparatus for the continuous procution of electrode material, the material consisting of pitch, coke dust, and coke particles of variable sizes and being formed into a carbonaceous structure by mixing and kneading, by simultaneous heat treatment.

BACKGROUND OF THE INVENTION

Electrode material of the invention is particularly suited for use in the aluminum industry. Such electrode material plays a role in the electrochemical process of producing aluminum and is needed in very large quantities. Each kilogram of aluminum requires about half a kilogram of electrode material, which can be used in the Söderberg furnace in the form of anode mass. Such Söderberg furnaces are equipped with continuous anodes, periodically coated with unburnt electrode briquettes. In this connection it is important to make sure that the basic material is produced in a way to have the proper grain size composition. The petroleum coke, which is precrushed, dried if necessary, ground, sifted and sorted out, will yield various coke fractions classified according to grain sizes and subsequently intermixed with bituminous coal tar pitch. The pitch plays the role of binding agent and fulfills the task of enveloping the coke particles and combine them to a pasty mass. The mass mixed and kneaded in this way, is imparted form at the outlet end of the mixing and kneading device, thus enabling the material to be cast in blocks or be formed into briquettes. The briquetted mass will then directly arrive to the continuous anodes of the Söderberg electrolytic furnace.

It has been already proposed to refrain from producing electrode material by the use of the classical, discontinuously operated so called trough mixer fitted with one or two agitator arms, but to use instead a mixing and kneading device that operates continuously, and which comprises a kneading worm member imparted a rotating motion as well as a reciprocating translatory motion. In such a case it is considered important to hold the operating conditions constant. This is a necessary condition for obtaining a uniform product. The pressure conditions prevailing in the mixing and kneading device are determined by the discharge cross-section provided at the outlet end of the system. The pressure conditions are generally changed by using nozzles and movable flaps, usually set manually by the operating personnel. Another solution known in the art provides for a discharge nozzle adjustable by means of a motor, and adapted to react to the pressure prevailing in the housing of a mixing and kneading device. However, the geometry of the completely kneaded mass is adversely affected by any changes in the cross-section of the nozzle provided at the outlet end of the mixing and kneading device.

OBJECT OF THE INVENTION

It is an object of the present invention, to provide an apparatus for forming the produced mass without detrimental effect upon the mixing and kneading operation.

SUMMARY OF THE INVENTION

This object is achieved in the continuous production of the electrode material consisting of pitch, coke dust and coke particles of variable sizes by mixing and kneading the components with simultaneous heat treatment in a first casing in order to form a carbonaceous structure; transferring the carbonaceous structure to a second casing connected to and spatially separated from the first casing; extruding and molding the carbonaceous structure in the second casing in order to extrude the coal structure by means of an extrusion orifice arranged in the second casing; and controlling the mixing-, kneading- and extrusion process by control means arranged in said first and second casing. With these features, the forming operation becomes decoupled from the operation of kneading, resulting in an increase in the output of the mixing and kneading device. This provides for improved economy, as well as for the possibility of simultaneously converting the mixed and kneaded mass into a larger number of smaller trains and to provide the same with any desired profile. Such a possibility is of particular importance in conjunction with producing the Söderberg mass composed of 20 to 40% bonding agent pitch, and required to be formed into small-sized briquettes. For reasons of economy and by considerations of environmental protection the trend is toward reducing the quantity of bonding agent. Such reduction, however, results in a higher viscosity of the final mass and added difficulties in deforming the same. By separating the forming operation from the operation of mixing and kneading, the use of multi-shaft extruders becomes possible, resulting in a considerable simplification of the required deformation.

The apparatus provided for carrying out the proposed method comprises a first cylindrical horizontal casing having extrusion means rotatable arranged in said second casing, an extrusion head for wide extrusion at the extrusion end of said extrusion means, a vertical chute connected to the outlet end of said first horizontal casing and to the inlet end of said second horizontal casing, and a control means with sensor arranged in said chute and connected to said rotatable extrusion means in order to control the rotation of said extrusion means. Furthermore, all of the features disclosed in the descriptive part of the specification and/or shown in the drawing are to be considered as being part of the invention, individually or in combination.

BRIEF DESCRIPTION OF THE DRAWING

An embodiment of the proposed apparatus is illustrated in the attached drawing, in which.

SPECIFIC DESCRIPTION

Figure 1:
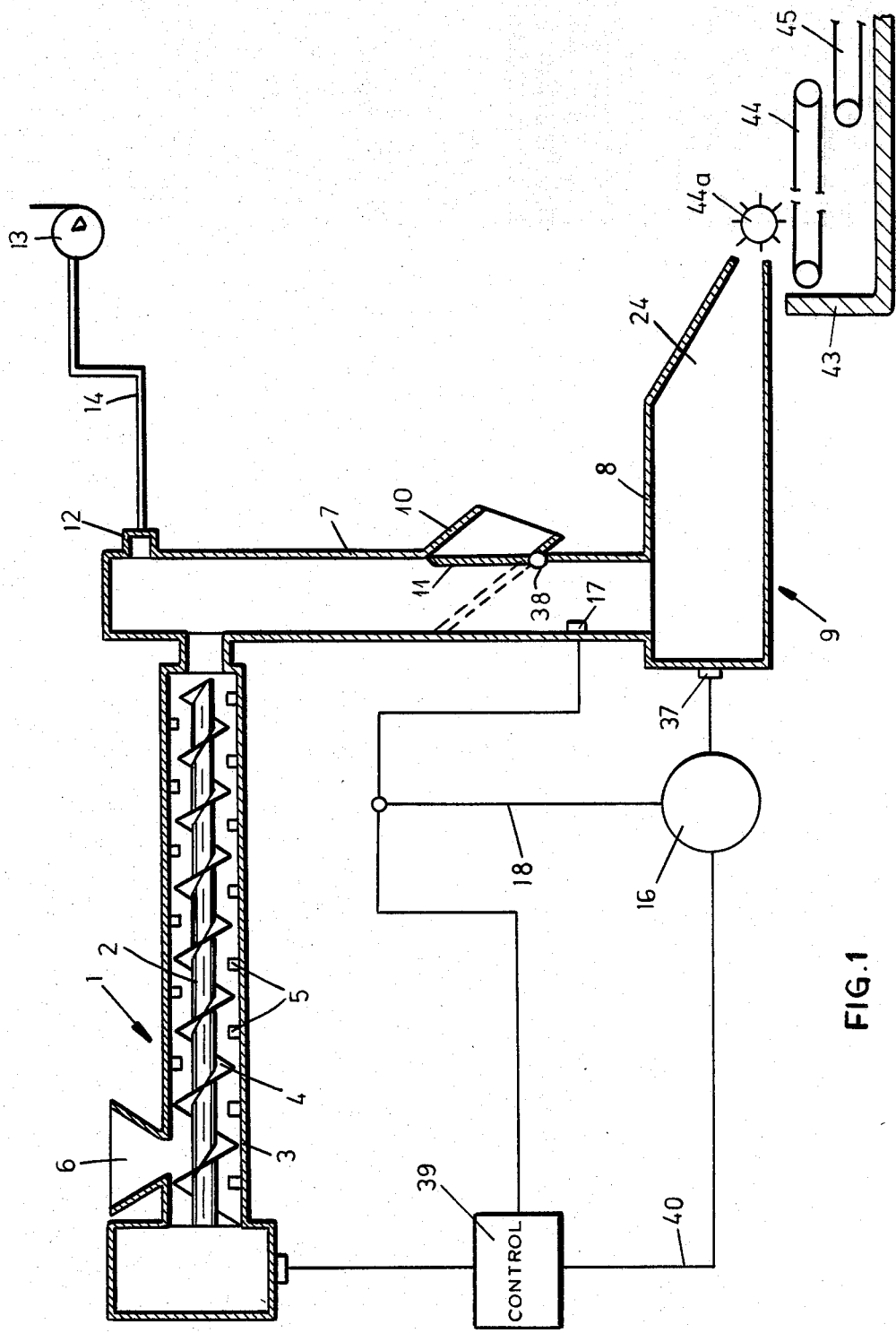
FIG. 1 shows the entire plant schematically illustrated.

The apparatus of the invention comprises a horizontally arranged continuously operated mixing and kneading device 1 with a rotating reciprocating worm shaft 2 supported in the housing 3. The worm shaft 2 is equipped with mixing and kneading wings 4 adapted to interact with the kneading members 5 that protrude from the inner wall of the housing in the radially inward direction. The pastes required for the Söderberg electrodes are made by extensively kneading coke dust with coal particle fractions and pitch in said continuously operated mixing and kneading device, so that the coal particle fractions become coated with pitch as the bonding agent. The coal particle fractions are then stored in separate silos and supplied to the housing 3 in appropriate dosages by way of a feed opening 6. The pitch is added in solid or liquid form, by way of the same opening 6 or by way of injector nozzles provided within the kneading space.

A vertical chute 7 is provided at the outlet end of the horizontal mixing and kneading device 1 and arranged to open at its lower end into the horizontal housing 8 of an extruder 9 shown schematically in the drawing. The vertical chute 7 is provided with an ejector orifice 10 associated with an ejector flap 11, which in its normal position shuts off the connection of the ejector orifice 10 to the inside of the vertical chute 7 and becomes part of the inside wall of said chute 7; in the position of the ejector flap 11 shown in dashed lines, on the other hand, the ejector orifice 10 is open, while the lower part of the vertical chute 7 is shut off. A setting motor 38 adapted to be actuated by way of a control device or member 39 is provided for setting the ejector flap 11 in position.

A suction device 13 is connected to a stud 12 provided at the upper end of the chute 7, by way of a suction conduit 14.

The automatic setting of the ejector flap 11 within the vertical chute 7 by means of the setting motor 38 takes place either when a predetermined allowable torsional moment acting on the shaft of the continuous mixing and kneading device 1 has been exceeded, or in response to the monitoring signals of the extruder. The extruder 8 driven by the motor 16 has a multi-shaft construction and comprises coacting worms rotating in the same sense or in opposite sense. The rotational speed of the extruder shafts is controlled in response to the level of materials present in the vertical chute 7. A level sensing device 17 is provided for this purpose in the chute 7 and adapted to continuously sense the level of the materials arriving from the mixing and kneading device 1, and accordingly to influence the motor 16 driving the extruder 9. In addition, a measuring device 37 is provided on the shaft of the extruder 9 and adapted to measure the driving power and/or the torsional moment, and/or the pressure in the extruder. The measured values are transmitted to the control device 39, which in turn is adapted to influence the setting motor 38 of the ejector flap and/or the drive motor 16 of the extruder 9. A cooling bath 43 is provided at the outlet end of the extruder nozzle 24 disposed in turn at the outlet end of the extruder 9. A first belt conveyor 44 and a second belt conveyor 45 slightly offset with respect to said first belt conveyor 44 are provided within the cooling bath 43. The first belt conveyor 44 is carried out in the form of a rubber belt conveyor; the formed pieces discharged through the nozzle 24 are cooled on this conveyor. These pieces have no stability of shape yet, and require to be supported; the rubber band of the conveyor belt 44 provides such support. The trains are cut off into briquettes by means of a transversal cutting device, while disposed on this rubber or steel band. Subsequently, the form pieces are transferred onto the second belt conveyor 44 provided with perforations and realized as a grid band. This type of construction makes it possible to cool the pieces so that they become somewhat stable in regards to shape, from underneath. In this way, the cooling route required for the complete cooling of the pieces turns out considerably shorter.

Figure 2:
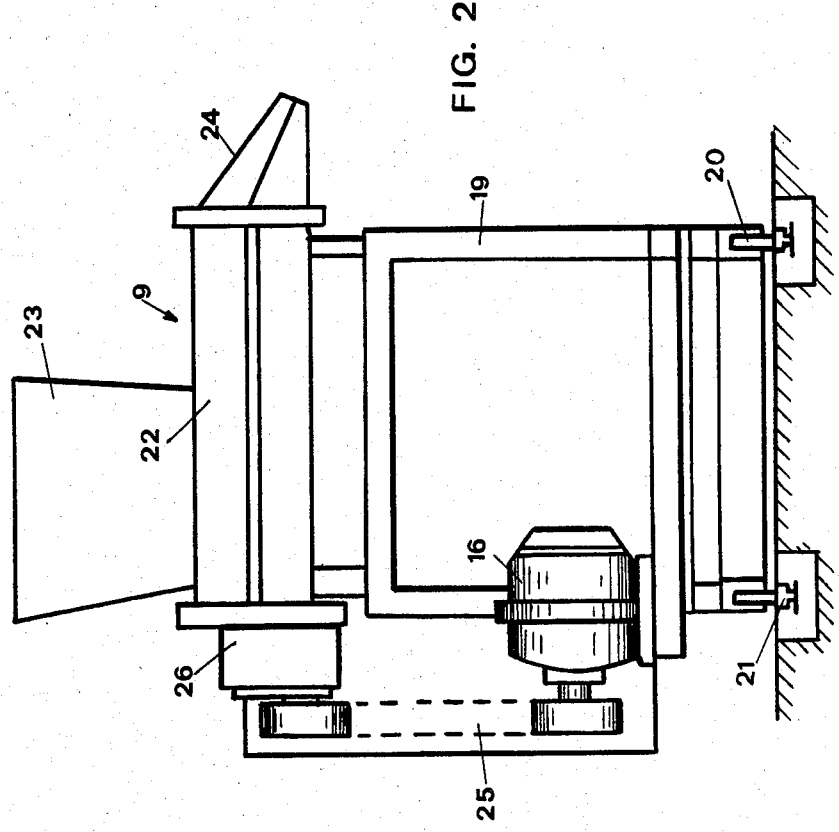
FIG. 2 shows a side view of the complete output device.
Figure 3:
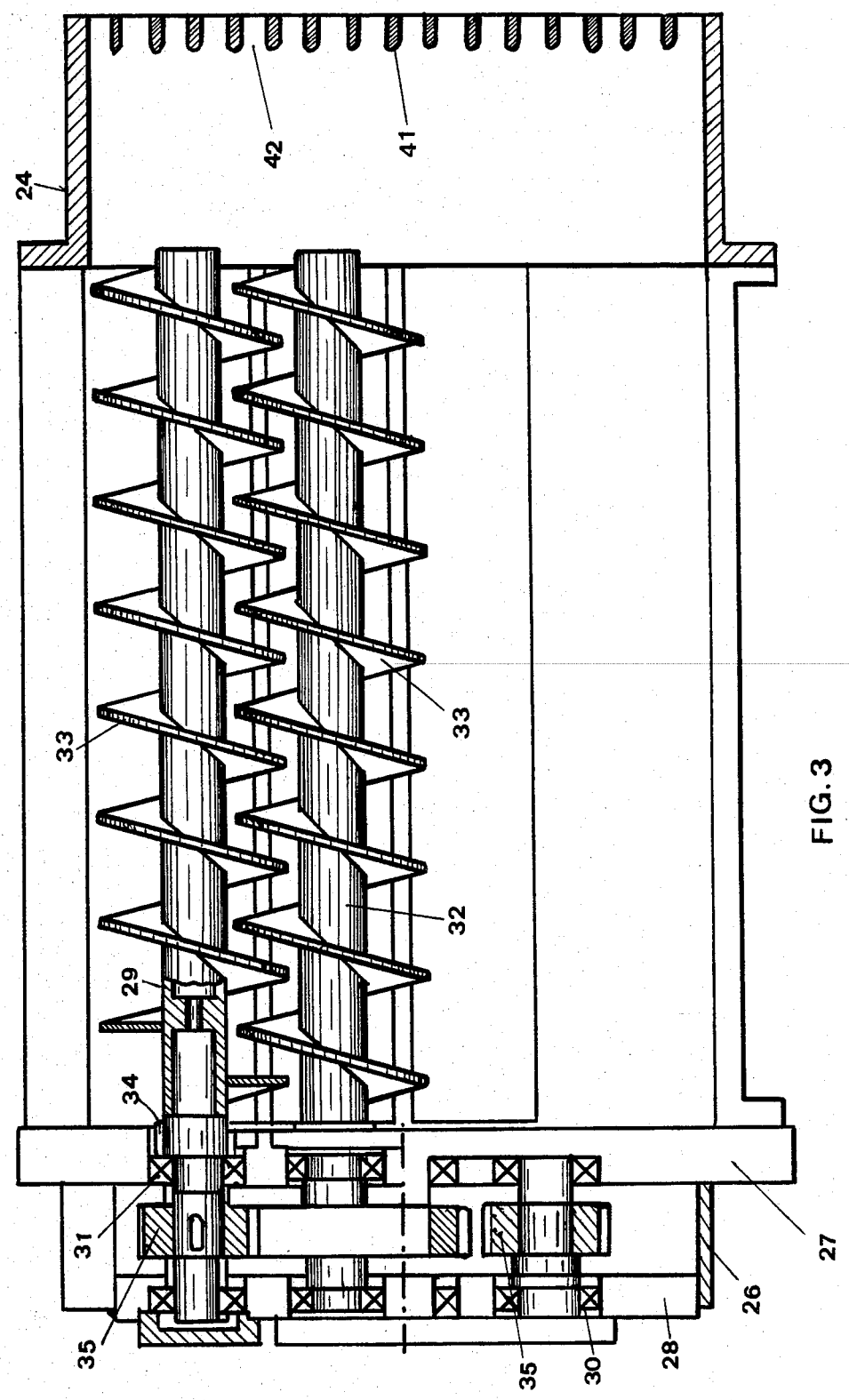
FIG. 3 shows an enlarged horizontal section through said output device.

The detailed construction of the extruder is illustrated in FIGS. 2 and 3. The extruder 9 comprises a car type carriage 19 equipped with wheels 20, and is displaceable along the rails 21. The extruder housing 22 rests on the carriage 19 and is preferably built of two pieces separated in the horizontal plane and adapted to be swung open. A feeding hopper 23 is provided on top of the housing 22, the front side of the housing 22 being arranged to carry a discharge nozzle 24, optionally adjustable.

The motor identified in FIG. 1 by the reference numeral 16 is mounted on the carriage 19 and is directly connected with the drive mechanism of the extruder 9 by means of a V-belt drive 25 or a clutch. The extruder drive mechanism is mounted within the drive mechanism housing 26, in turn mounted to the housing 22, at the end thereof removed from the discharge nozzle 24.

At its one end, the housing 22 also comprises a removable front plate 27, which supports the drive mechanism housing 26; this in turn comprises another front plate 28.

Four extruder shafts 29 are arranged within the housing 22 and disposed adjacent to each other in the horizontal central plane, and are supported at their one end by the front plates 27 and 28. The corresponding bearings are identified by the reference numerals 30 and 31. The shafts 29 are connected with hollow shafts 32 equipped with worm members 33 in engagement with each other. The hollow shafts 32 are press-fitted on their associated shaft studs 29 and secured by splined pins and bolts. The processed mixture of materials is prevented by means of labyrinth seals 34 from escaping along the shafts. The drive mechanism housing 26 also houses the gears 35 disposed on the shaft studs 29, which together constitute the drive mechanism and are connected with the motor 16.

The other end of the housing 22 removed from the front plate 27 is open, and carries the discharge nozzle 24, said hollow shafts 32 which carry the worm members 33 being arranged to extend as far as the inner mouth of the discharge nozzle 24. The forming members 41 of the preferably two-pieced nozzle are cast either onto the upper nozzle housing part or onto the lower nozzle housing part, and are realized in the form of beams mounted by screws onto the respective nozzle housing part. A total of 24 trains are produced by the nozzle, the number of strands, however, being adapted to be varied by appropriate constructional measures. As many as 50 strands may be produced; it is preferable, however, to use nozzles comprising forming channels adapted to produce between four and thirty strands. Part of the forming channels 42 which, depending on the desired profiles, are designed rectangular, round, or oval, be preferably adapted to be shut-off. Sliders or shutting plugs may be used for this purpose. The actuation of the sliders may be accomplished by mechanical, pneumatic, hydraulic or electrical methods. The upper part of the nozzle 24 is adapted to be swung open, said upper part being movable by means of the pivot arms 36. This swinging open may be accomplished manually or automatically, for example by means of a valve control mechanism adapted to signalize the occurrence of any excess pressure within the nozzle 24 and to trigger an alarm, or to directly activate an opening mechanism.

Another possibility consists in using the level sensing device 17 provided in the vertical chute 7 for actuating a mechanism for opening and closing the flap of the nozzle 24. Provisions may also be made to have an optical signaling device or an alarm device actuated at the same time, to call attention to any disturbances in the operation. The described system provides for the forming operation to take place in the extruder rather than the mixing and kneading device, i.e. separated in regard to space from the mixing and kneading device. The operation of mixing and kneading will then be uncoupled from the operation of imparting form, with the result, that the output in the kneading device may be considerably increased and the economy improved. It is also possible, to simultaneously extrude a larger number of trains, while profiles of any desired cross-section may be produced. The Söderberg mass should preferably consist of briquettes of equal sizes; this may be accomplished by greatly reduced quantities of bonding agent, if the multi-shaft extruder is used. The multi-shaft extruder can accomplish the required production without difficulties, in spite of the higher viscosities and more difficult deformations encountered.

The ejector flaps 11 provided in the vertical chute has the role of a deflector, which, when starting up the process, is set in ejecting position. Subsequently, the flap 11 is reset, so that the ejector orifice 10 remains closed. It is now possible to incorporate an additional safety device, which activates the flap 11, as soon as the torsional moment developed in the mixing and kneading system has exceeded its allowable limit. In this case, a force measuring device 37 will be provided on the shaft 2 of the mixing and kneading device and arranged to be connected, by way of a control member 39, with the setting motor 38 that activates the ejector flap 11. Should an unallowed deviation from the prescribed material composition recipe take place, caused by an accidental overdose of coke dust or by an unintended reduction or stoppage in the supply of pitch, this will cause the viscosity of the kneaded mass and, at the same time, the torsional moment applied to the kneading shaft of the mixing and kneading device to increase. The measuring device 37 for the torsional moment will sense the unallowed increase and cause, by way of the control device 39, a perhaps delayed opening of the flap 11; this will result in the elimination of the material that has deviated from the prescribed composition recipe, from the process.

The monitoring of the extruder shafts 32 may be combined with the activation of the ejector flap 11. In such a case, the drive motor 16 will be additionally influenced by the control device 39, the latter being operatively connected with the motor 16 by way of a connection 40.

The rotational speed of the extruder shafts 32 is controlled by means of the level sensing device 17 in a way to make the motor 16 increase said rotational speed and to increase at the same time the production output of the extruder, as soon as a predetermined level of material has been reached in the vertical chute 7. The rotational speed of the extruder shafts is monitored at the input side of the drive mechanism.

It will be also be mentioned, that the housing 22 is preferably carried out double-walled, so that the inside of the housing 22 may be heated or cooled. In this case, it may be of advantage to provide two or more sections circulating the heating or cooling medium in circuits independent of each other, so that the housing may be held at temperatures varying from section to section. Since, furthermore, the housing is built of two parts, cleaning and servicing the inside of the housing and the worm members is greatly facilitated.

The described system is eminently suited to carry out the proposed method in continuous operation in any easy and simple manner. The system may be fully automated and remotely controlled, while the described safety devices guarantee a trouble-free operation. The extruder built as a separate unit is transportable on wheels, thus considerably facilitating its servicing.

What we claim is:

1. An apparatus for the continuous production of electrode material from pitch, coke dust and carbonaceous particles of various sizes, producing kneadable mass, comprising:
   a first cylindrical horizontal casing having a worm disposed axially therein on a shaft and provided with an inlet for said composition at an upstream end of said casing and an outlet for the kneaded mass at a downstream end thereof;
   a second horizontal casing disposed below said first casing and formed with extrusion means including at least one worm rotatable in said second casing, said second casing having an inlet located below said outlet of said first casing;
   an extrusion head at a downstream end of said second casing for extruding said material;
   a vertical chute connected to said outlet of said first casing and said inlet of said second casing for transferring the kneaded mass from said first casing to said second casing;
   control means having a sensor in said chute and connected to said extrusion means for controlling rotation thereof; and
   means forming a lateral ejector aperture in a wall of said chute and having an ejector flap pivotally arranged in said chute for swinging movement between a first position in which said flap closes said aperture to permit said mass to pass from said first casing to said second casing, and a second position in which said flap unblocks said aperture and diverts descending portions of said mass out through said aperture while blocking downward movement of said mass to said second casing.

2. The apparatus defined in claim 1, further comprising a control motor connected to said flap for displacing same between said positions and a control device connected to said motor for controlling same.

3. The apparatus defined in claim 1 wherein said control means includes a level sensing device which is operatively connected to a drive of said extrusion means.

4. The apparatus defined in claim 1, further comprising measuring means on a shaft of said extruder responsive to a parameter of the operation thereof and operatively connected to said flap for controlling same.

5. The apparatus defined in claim 1 wherein said second casing is provided on a carriage displaceable transversely to the direction of extrusion.

6. The apparatus defined in claim 1, further comprising means forming a cooling bath at said downstream end of said second casing receiving an extruded strand from said head, and a pair of conveyors including a first belt receiving the extruded material from said head and a second belt receiving the extruded material from said first belt, said second belt being perforated.

7. The apparatus defined in claim 6, further comprising means for cutting up a strand extruded from said head to form briquettes of said material on said first belt.

8. The apparatus defined in claim 1 wherein said second casing is divided along a central horizontal plane to form two relatively movable housing parts relatively displaceable to open and close said second casing, said second casing being provided with at least two extruder shafts disposed parallel and adjacent one another and connected to a common drive mechanism having drive members mounted outside said second casing at one end thereof.

9. The apparatus defined in claim 8 wherein each extruder shaft comprises a stud on which a hollow shaft carrying a worm member is mounted.

10. The apparatus defined in claim 9 wherein said extruder shafts are supported only at said one end and extend in candelabra manner in said second casing.

11. The apparatus defined in claim 10 wherein said extrusion head comprises a discharge nozzle having two halves and provided with four members for the simultaneous production of parallel extruder strands.

12. The apparatus defined in claim 11 wherein the head is provided with shut-off members for preventing said strands from issuing from said head selectively.

13. The apparatus defined in claim 12 wherein said nozzle comprises two halves mounted to swing outwardly away from one another.

* * * * *